US 6,668,715 B1

(12) United States Patent
Biro et al.

(10) Patent No.: US 6,668,715 B1
(45) Date of Patent: Dec. 30, 2003

(54) METHOD AND APPARATUS FOR SIMULTANEOUSLY EMBOSSING AND PRINTING AN EXTRUDED PLASTIC SLAT

(75) Inventors: Walter Biro, Boca Raton, FL (US); Michael Julius Biro, Boca Raton, FL (US)

(73) Assignee: Isoteck Corporation, Pompano Beach, FL (US)

( * ) Notice: Subject to any disclaimer, the term of this patent is extended or adjusted under 35 U.S.C. 154(b) by 375 days.

(21) Appl. No.: 09/667,339

(22) Filed: Sep. 22, 2000

(51) Int. Cl.[7] .............................................. B29C 59/04
(52) U.S. Cl. ............................ 101/32; 101/3.1; 101/6; 156/209; 264/132
(58) Field of Search .................... 101/3.1, 5, 6, 16, 101/17, 24, 32, 211, 487, 490; 156/209, 244.16; 264/132, 284

(56) References Cited

U.S. PATENT DOCUMENTS

| | | | |
|---|---|---|---|
| 3,887,678 A | * | 6/1975 | Lewicki, Jr. ................. 264/284 |
| 4,049,374 A | | 9/1977 | Rejto |
| 4,112,189 A | * | 9/1978 | Terwilliger ................. 428/443 |
| 4,116,737 A | | 9/1978 | Svens |
| 4,223,057 A | | 9/1980 | Rejto |
| 4,842,036 A | | 6/1989 | Goodman |
| 4,936,215 A | | 6/1990 | Walker et al. |
| 5,311,814 A | | 5/1994 | Kierson |
| 5,636,676 A | * | 6/1997 | Fishlin ................. 160/168.1 R |
| 5,662,977 A | | 9/1997 | Spain et al. |
| 6,006,816 A | | 12/1999 | Biro |
| 6,153,283 A | * | 11/2000 | Pierson et al. ............... 428/141 |
| 6,183,671 B1 | * | 2/2001 | Stauffacher et al. ........ 264/40.1 |
| 6,196,127 B1 | * | 3/2001 | Yamamoto et al. ......... 101/129 |
| 6,296,731 B1 | * | 10/2001 | Fujii et al. ................... 156/209 |
| 6,347,480 B1 | * | 2/2002 | Weder ............................ 47/72 |

* cited by examiner

*Primary Examiner*—Andrew H. Hirshfeld
*Assistant Examiner*—Kevin D. Williams
(74) *Attorney, Agent, or Firm*—Ronald V. Davidge (57) ABSTRACT

A decorative relief pattern is applied to one or both sides of thermoplastic slat material by rolling an embossing roller in contact with the side(s) to receive the pattern. The embossing roller has an inverse relief pattern which is an inverse of the relief pattern applied to the slat material. A transfer roller applies an ink layer to the embossing roller, with the resulting thickness of the ink layer varying according to features of the inverse relief pattern. Depressed areas of the inverse relief pattern receive relatively little ink. An air stream from an air knife is applied to the ink layer, with ink being preferentially cleaned from relatively smooth areas of the inverse relief pattern. Then, a portion of the ink remaining on the embossing roller is transferred to the slat material along with the formation of the embossed pattern in the slat material.

11 Claims, 5 Drawing Sheets

METHOD AND APPARATUS FOR SIMULTANEOUSLY EMBOSSING AND PRINTING AN EXTRUDED PLASTIC SLAT

BACKGROUND INFORMATION

1. Field of Invention

This invention relates to decorating extruded plastic slat material for use in vertical or horizontal blinds, and, more particularly, to simultaneously applying an embossed relief pattern and an ink printed pattern to such material following its discharge from an extrusion die, with the printed pattern and the embossed relief pattern having a predetermined relationship with one another.

2. Description of the Related Art

A number of patents describe methods for applying an embossed texture pattern to extruded plastic slat material for vertical blinds. For example, U.S. Pat. No. 5,311,514 describes an assembly for forming or embossing a decorative pattern on at least one exposed surface of an elongated slat, particularly of the type used in a vertical blind assembly. A pair of driven rollers engage opposite sides of a slat immediately after its formation by a plastic extruder. The exterior surfaces of one of the rollers has decorative patterns formed therein. The temperatures of the rollers are regulated to facilitate transfer of the decorative pattern, continuous movement of the slat through the rollers, and formation of the transverse or cross-sectional configuration of the slat concurrently to placing the decorative pattern thereon. While such patents describe means for placing a texture pattern on the slat, what is needed is a method for also applying a printed pattern, disposed in a preferred pattern related to the texture pattern, on the slat material.

A number of other patents describe various methods for providing slat material having color patterns and texture patterns in registration with one another. For example, U.S. Pat. No. 4,842,036 describes vertical blind slat assemblies including laminates comprising strand material which is not free hanging and in which there are substantial spaces between strands to allow light to pass through the material, and a sheet-like layer to which the strand material is secured, so that the strands of the laminate are fixed. The laminates allow the color or other characteristics of a slat member or insert to be seen. The laminates can have differing surface characteristics (e.g. texture) and strand colors, sizes, and patterns. The laminate can be attached to the slat member directly, as by adhesive, or it may removably secured to a groover slat member. While the desirability of a pattern of raised or textured surfaces, with a corresponding color pattern, is thus recognized, what is needed is a method for forming a slat having such patterns in an integral part, without requiring assembly procedures.

U.S. Pat. No. 4,116,737 describes a method for creating an embossed effect in a desired pattern on a film by printing an agent on the film in the desired pattern to lower the stability of the film in the print areas against heat distortion and laminating the film to a substrate by fusion immediately after the substrate is extruded to cause the print areas to distort and give an embossed appearance as a result of the heat incident to the fusion. While this method is adapted for simulating the texture of a wood grain pattern, what is needed is a method to form relatively large texture objects providing greater flexibility in the design of the texture pattern, and a method for forming an integral part without a need for laminating separate materials.

U.S. Pat. No. 4,223,057 describes a fabric containing thermoplastic fibers, which is simultaneously printed with a first pattern in a sublimable or vaporizable dye and embossed or surface textured with a second pattern, without substantial effect on the printing of the first pattern, by the application of heat and pressure to a stack comprising a heat transfer printing sheet bearing a vaporizable or sublimable dye in the first pattern, an embossing sheet of material permeable to said dye and having no affinity or retention properties therefor, and having a second pattern formed in relief in at least one surface thereof, and a sheet of fabric to be printed and embossed. The printing and embossing sheets may be combined into a unitary sheet, and the embossing sheet may include a dye trap such as an emulsion or solution of an acrylic resin disposed in a third pattern. This process relates to the simultaneous heat transfer printing and embossing or surface texturing of fabrics and other sheet materials. What is needed is a method for using an embossing medium to carry inks for printing a desired pattern of color without requiring the use of a separate transfer sheet and without placing a requirement on the embossing material to allow transmission therethrough of a dye material. Also, what is needed is a method for simultaneously printing and embossing relatively thick and non-fiberous materials, such as slats for vertical blinds.

U.S. Pat. No. 6,006,816 describes a method in which extruded material for forming blind slats, and having at least one textured surface with raised areas and adjacent lower areas, is passed through a spray painting process applying a substantially thicker coating of paint to the raised areas than to the adjacent lower areas. While this method applies a colored paint image to slat material after it has been embossed, what is needed is a method having more control over the painted image, which also allows greater variations in parameters affecting the painted image, and a method simultaneously applying the embossed and printed image, which can be accomplished without the using a dedicated paint spray.

A number of other patents describe methods for applying ink to operating surfaces within printing apparatus. For example, U.S. Pat. No. 4,936,215 describes printing apparatus including a printing roller which abuts the cylindrical surface of an impression roller, in which ink is transferred from an anilox roller via the printing roller to the impression roller. What is needed is apparatus incorporating both a printing function and an embossing function for application to extruded slat material.

SUMMARY OF THE INVENTION

In accordance with a first aspect of the present invention, a method, including steps of applying ink to a peripheral surface of an embossing roller and bringing the peripheral surface of the embossing roller into rolling contact with a surface of thermoplastic slat material, is provided for applying a decorative relief pattern to the surface of the slat material. The embossing roller includes an inverse relief pattern, which is an inverse of the decorative relief pattern. That is, the inverse relief pattern has grooves to form ridges in the decorative relief pattern, etc. The ink forms an ink layer extending along a portion of the peripheral surface of the embossing roller and varying in thickness in accordance to features of the inverse relief pattern. The inverse pattern forms the decorative relief pattern on the surface of the slat material, with a portion of the ink layer being transferred from the peripheral surface of the embossing roller to the surface of the slat material.

The inverse relief pattern preferably includes areas at various levels of depression from an outer surface level of the inverse relief pattern. The ink layer is applied to the peripheral surface of the embossing roller from a transfer surface having an ink coating with a predetermined thickness, with the ink layer on the peripheral surface of the embossing roller decreasing in thickness with increases in levels of depression from the outer surface level.

The inverse relief pattern preferably also includes areas having various textures, including smooth and rough areas, with the method additionally including a step of exposing the peripheral surface of the embossing roller to a stream of air directed at the peripheral surface between the steps of applying ink to the peripheral surface and of bringing the peripheral surface into rolling contact with a surface of the slat material. This stream of air removes ink preferentially from smooth areas, while ink is retained in the rough areas.

This method may be applied only to a first side of the slat material, with the reverse side of the slat material remaining smooth, or the method may be applied to the second side of the slat material following its application to the first side, so that both sides are textured and colored with an ink pattern.

DETAILED DESCRIPTION OF THE INVENTION

Figure 1:
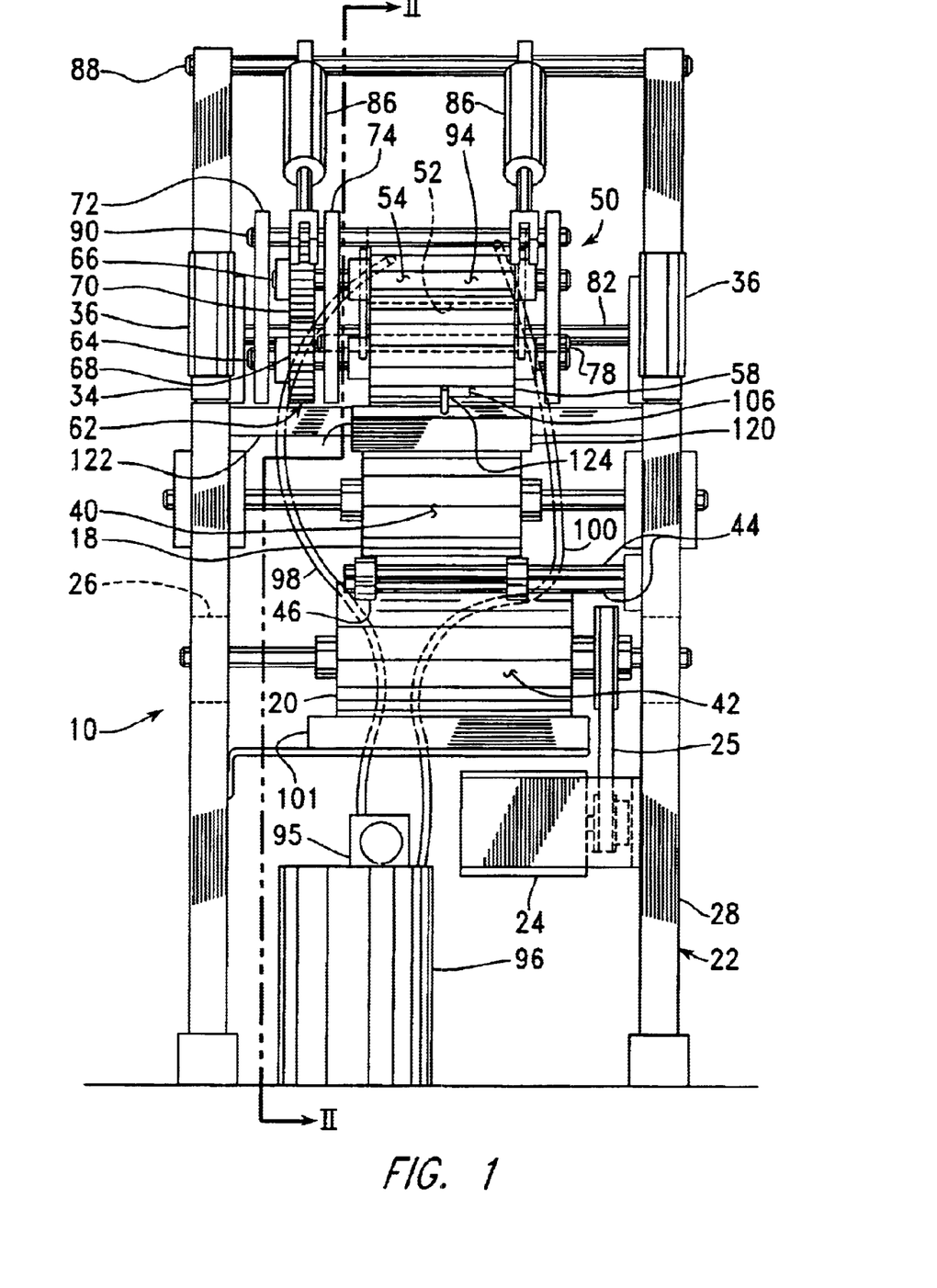
FIG. 1 is a right end view of apparatus built in accordance with the present invention for simultaneously embossing and printing extruded slat material.
Figure 2:
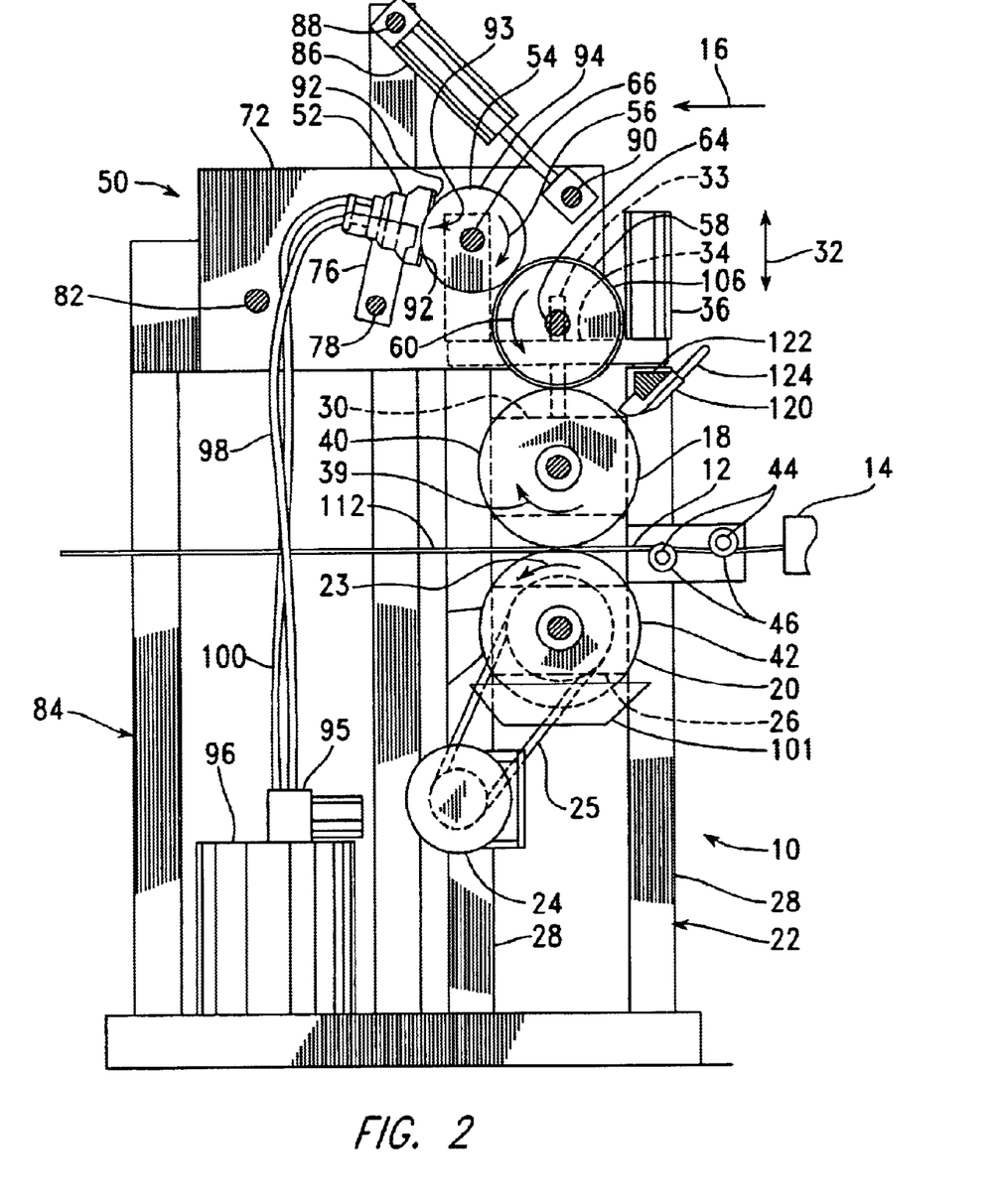
FIG. 2 is a cross-sectional front elevation of the apparatus of FIG. 1, taken as indicated by section lines II—II therein.

FIGS. 1 and 2 show a first surface finishing station, generally indicated as 10, built in accordance with the present invention for simultaneously embossing and printing thermoplastic slat material 12 being extruded from a die 14 in the direction of arrow 16. The slat material 12 is, for example, composed of polyvinyl chloride. FIG. 1 is a right end view of the first surface finishing station 10, while FIG. 2 is a cross-sectional front elevation of the first surface finishing station 10, taken as indicated by section lines II—II in FIG. 1 to reveal internal details of the first surface finishing station.

The extruded slat material 12 is pulled between an embossing roller 18 and a back-up roller 20. Both of these rollers 18, 20, which are of metal construction, are rigidly and rotatably mounted within a first framework 22, with the back-up roller 20 being driven in the direction of arrow 23 by a motor 24. A drive belt 25 or suitable roller chain is used to drive the back-up roller 20 from the motor 24. The back-up roller 20 is rotatably mounted within a pair of stationary bearing blocks 26, which extend between frame posts 28 on each side of the rollers 18, 20. The embossing roller 18 is rotatably mounted in a pair of sliding bearing blocks 30, which are in turn mounted to slide in the vertical directions of arrow 32 between the frame posts 28. Each sliding bearing block 30 is held in place by an adjustment screw 33 extending downward from a cross-bar 34. The threads of the adjustment screw 33 engage a threaded hole within the cross-bar 34, while the sliding bearing block moves vertically with the lower end of the adjustment screw 33 as the screw 33 is turned. Each cross-bar 34 is mounted at the top of the frame posts 28 by means of air cylinders 36, which are used to hold the rolls 18, 22 apart for maintenance of the first surface finishing station 10. The embossing roller 18 is preferably freely rotating, being rotationally driven in the direction of arrow 39 through the extruded slat material 12 by means of the rotation of back up roll 20.

The peripheral surface 40 of the embossing roller 18 includes the pattern to be embossed on the upper surface of the extruded slat material 12. This pattern on the peripheral surface 40 is reversed as required for the embossing process. The peripheral surface 42 of the back-up roller 20 is smooth, as required for backing-up the embossing process.

The speed of motor 24 is adjusted with the speed at which the slat material 12 is extruded from the die 14 so that excessive tension is not applied to the material 12, and so that excessive sagging of the material 12 is also prevented. A pair of guide posts 44 extending from the first framework 22 also minimize sagging, while controlling the angle at which the slat material 12 enters the rollers 18, 20. Each guide post 44 also has a pair of guiding collars 46, between which the slat materia 12 is drawn, to further control its position between the rollers 18, 20.

The first surface finishing station 10 also includes a printing station, generally indicated as 50, for applying a pattern of ink to the peripheral surface 40 of the embossing roller 18. The printing station 50 includes an ink cavity 52, an anilox roller 54, turning in the direction of arrow 56, which picks up liquid ink from the ink cavity 52, and a transfer roller 58, which carries at least a portion of this liquid ink from the anilox roller 52 to be deposited on the peripheral surface 40 of the embossing roller 18. Preferably, the transfer roller is rotationally driven in the direction of arrow 60 by contact with the peripheral surface 40 of the embossing roller 18, while the anilox roller 54 is driven in the direction of arrow 56 by the rotation of the transfer roller 58, through a gear train 62, extending between a shaft 64 attached to the transfer roller 58 and a shaft 66 attached to the anilox roller 54. The gear train is configured to drive the rollers 54, 58 at the same peripheral speed, including, for example, a main gear 68, 70 on each of the shafts 64, 66 and a pair of idler gears (not shown) operating between these main gears 68, 70.

The printing station 50 also includes a pair of side plates 72 and an intermediate plate 74, which are used to mount various components, including the rotatably mounted shafts 64, 66. The ink cavity 52 is mounted by means of brackets 76 and shaft 78. The printing station 50 is pivotally mounted on a shaft 80, extending between mounting plates 82 forming part of a second framework 84. A pair of pneumatic cylinders 86, extending between an upper shaft 88 forming part of the second framework 84, and a lower shaft 90, held within the side plates 72, are used to pivot the printing station 50 upward when this action is needed for maintenance.

The ink cavity 52 includes seals 92 extending around an opening 93 and engaging a peripheral surface 94 of the anilox roller 54. Liquid ink is circulated through the ink cavity 52 by means of a pump 95 operating atop a paint supply reservoir 96, and is made available to the peripheral surface 94 through the opening 93 surrounded by seals 92. Ink is pumped upward through a supply hose 98, and returned downward, to maintain circulation, through a discharge hose 100.

The first surface finishing station 10 preferably additionally includes a cleaning tray 101, located under the back-up roller 20, which is partly full of water to clean ink from the back-up roller 20. This cleaning tray 101, which is partly filled with water, includes a sponge (not shown) in contact with the peripheral surface 42 of the back-up roller 20.

Figure 3:
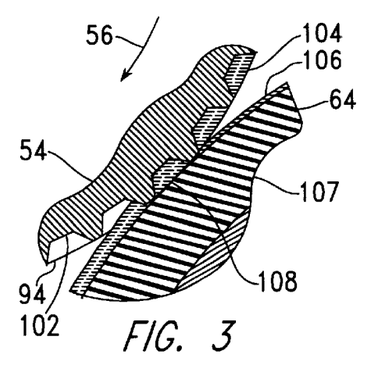
FIG. 3 is a fragmentary transverse cross-sectional view of a portion of an anilox roller in the apparatus of FIG. 1, being driven in contact with a transfer roller therein to apply a layer of ink to the transfer roller.

FIG. 3 is a fragmentary transverse cross-sectional view of a portion of the anilox roller 54 being driven in the direction of arrow 56 in contact with the transfer roller 64, showing a transfer of ink from the anilox roller 54 to the transfer roller 64. The peripheral surface 94 of the anilox roller 54 includes a number of roller cavities 102, which are, for example, 0.08 mm (0.003 inch) to 0.13 mm (0.005 inch) deep. Passing through the opening 93 in the ink cavity 52, these cavities 102 are at least partly filled with liquid ink 104. The peripheral surface 106 of the transfer roller 58 is formed as a rubber coating 107 to which at least a portion of the liquid ink 104 within the roller cavities 102 is transferred within a contact region 108. The rubber coating 107 is, for example, 1.6 mm (0.062 inch) to 9.5 mm (0.375 inch) thick, having a durometer of 40–80.

Figure 4:
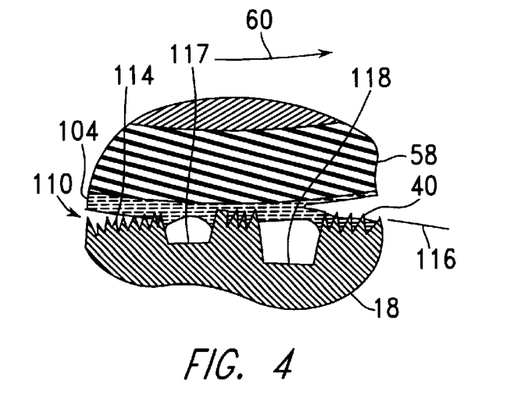
FIG. 4 is a fragmentary cross-sectional view of a portion of the transfer roller of FIG. 3, rolling in contact with an embossing roller in the apparatus of FIG. 1, to transfer a layer of ink to the embossing roller.

FIG. 4 is a fragmentary transverse cross-sectional view of a portion of the transfer roller 58 rotating in the direction of arrow against the embossing roller 18. According to a preferred version of the present invention, the peripheral surface 40 of the embossing roller 18 includes a relief pattern 110 to be embossed into an upper surface 112 of the extruded slat material 12, with the relief pattern 110 including areas having differing surface levels and textures. The relief pattern 110 is an inverse of the relief pattern to be produced on the surface of the slat material 12, in that, for example, grooves in the relief pattern 110 form ridges in the relief pattern to be produced on the surface of the slat material. For example, the relief pattern 110 includes first areas 114 having a relatively rough surfaces extending downward 0.13 mm (0.005 inch) from the outer surface level 116 of the peripheral surface 40, second areas 117 having smooth surfaces extending downward 0.25 mm (0.01 inch) from the outer surface level 116, and third areas 118 having smooth surfaces extending downward 0.37 mm (0.015 inch) from the outer surface level 116. When the relief pattern 110 comes into contact with the liquid ink 104 being carried by the transfer roller 58, part of the ink 104 is transferred from the transfer roller 58 to the relief pattern 110, with a greater proportion of the ink 104 being transferred to the areas, such as areas 114 which are least depressed from the outer surface level 116, and with a lesser proportion of the ink 104 being transferred to the areas, such as areas 118, which are the farthest depressed from the outer surface level 116. This process occurs, for example, because the limited thickness of the layer of ink 104 on the peripheral surface 106 allows the ink 104 to reach all of the level of the areas 114, but to reach only a portion of the areas 118.

Referring again to FIGS. 1 and 2, the first surface finishing station 10 additionally includes an air knife 120 mounted on a bar 122 extending between posts 28 as a part of the first frame 22. The air knife 120, which is supplied with compressed air through a hose 124, directs a stream of air radially toward the periphery 40 of the embossing roller 18.

Figure 5:
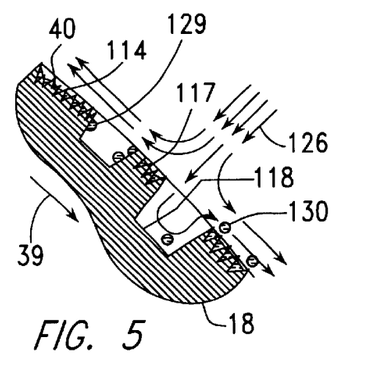
FIG. 5 is a fragmentary transverse cross-sectional view of a portion of the embossing roller of FIG. 4, moving past an air stream from an air knife within the apparatus of FIG. 1.

FIG. 5 is a fragmentary transverse cross-sectional view of a portion of the embossing roller 18 moving past an air stream, indicated by arrows 126, from the air knife 120. The depth of the areas 114, 117, 118 from the outer surface level 116 has no significant effect on the movement of air past these areas 114, 117, 118. On the other hand, while air, represented by arrows 128, moving along the peripheral surface 40 of the embossing roller can remove paint particles or droplets 129 within the smooth areas 117, 118, the rough surfaces of areas 114 provide a relief pattern of crevices in which paint is held without being removed by airflow. Much of the paint particles or droplets 130 removed by the airflow from the smooth areas 117, 118, are redeposited on adjacent rough surfaces of areas 114. In this way, the depth of various areas of the relief pattern 110, and the texture of these areas provide separately variable but complimentary controls of the density of paint remaining on the areas of the relief pattern 110 after this relief pattern is moved by the air knife 120.

Figure 6:
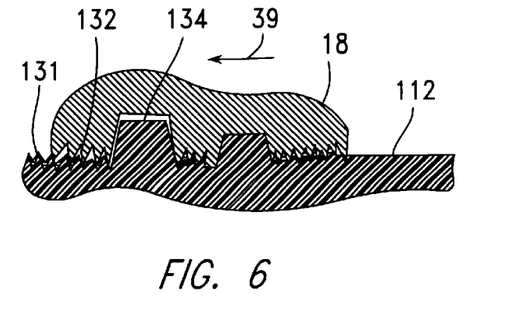
FIG. 6 is a fragmentary transverse cross-sectional view of a portion of the embossing roller of FIG. 4, moving in rolling contact with the upper surface of the extruded slat material.

FIG. 6 is a fragmentary transverse cross-sectional view of a portion of the embossing roller 18 moving by the upper surface 112 of the extruded slat material 12. The embossing process forms a textured relief pattern 131 within the upper surface 112, with the relief pattern 131 being a reversal of the relief pattern 110 on the embossing roller 18. This process also transfers at least a portion of the ink previously remaining on the texture relief pattern 110 to the relief pattern 131. The density of ink deposited in various areas of the relief pattern 131 depends on the density of ink remaining on the corresponding areas of the relief pattern 110 after passage by the air knife 120. Thus, the relief pattern 131 is formed with rough areas 132 having more paint than smooth surfaces 134, and with raised areas 136 having less paint, if any paint.

Figure 7:
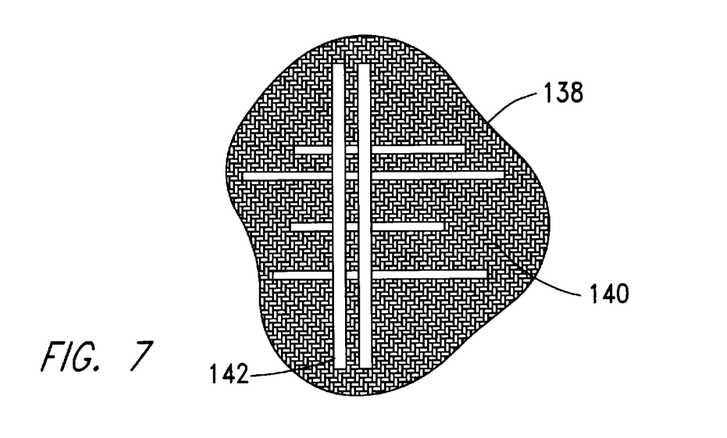
FIG. 7 is a fragmentary plan view of a pattern formed on the upper surface of extruded slat material within the apparatus of FIG. 1.

FIG. 7 is a fragmentary plan view of an exemplary relief pattern 138 formed on the upper surface 112 of the extruded slat material 12. The relief pattern 138 represents a textile material, with a rough background area 140 and raised, but relatively smooth, areas 142 representing horizontal and vertical threads. Because the background area 140 is depressed within the relief pattern 138, and because the background area 140 is relatively rough, this area 140 is covered with a relatively high density of ink. Because the areas 142 representing threads are raised and relatively smooth, they are covered with a relatively low density of ink or with no ink at all. Preferably, the colors or levels of tint of the ink and the base material composing the extruded slat material 12 are contrasting, making the background area 140 and the areas 142 representing individual threads appear to be substantially different.

The processes for using both the texture and the relative height of features to determine variations in the color of features can be used in the complimentary fashion described above or separately. For example, if it is determined to be desirable to reduce the contrast between rough and smooth areas, the flow of air through the air knife 120 may be turned off, or the air knife 120 may itself be omitted, causing the color contrast to result primarily or entirely from differences in the elevation of the features in the relief pattern. On the other hand, differences in the elevation of features may be eliminated, with resulting changes in color or tint resulting from changes in texture of the relief pattern.

Figure 8:
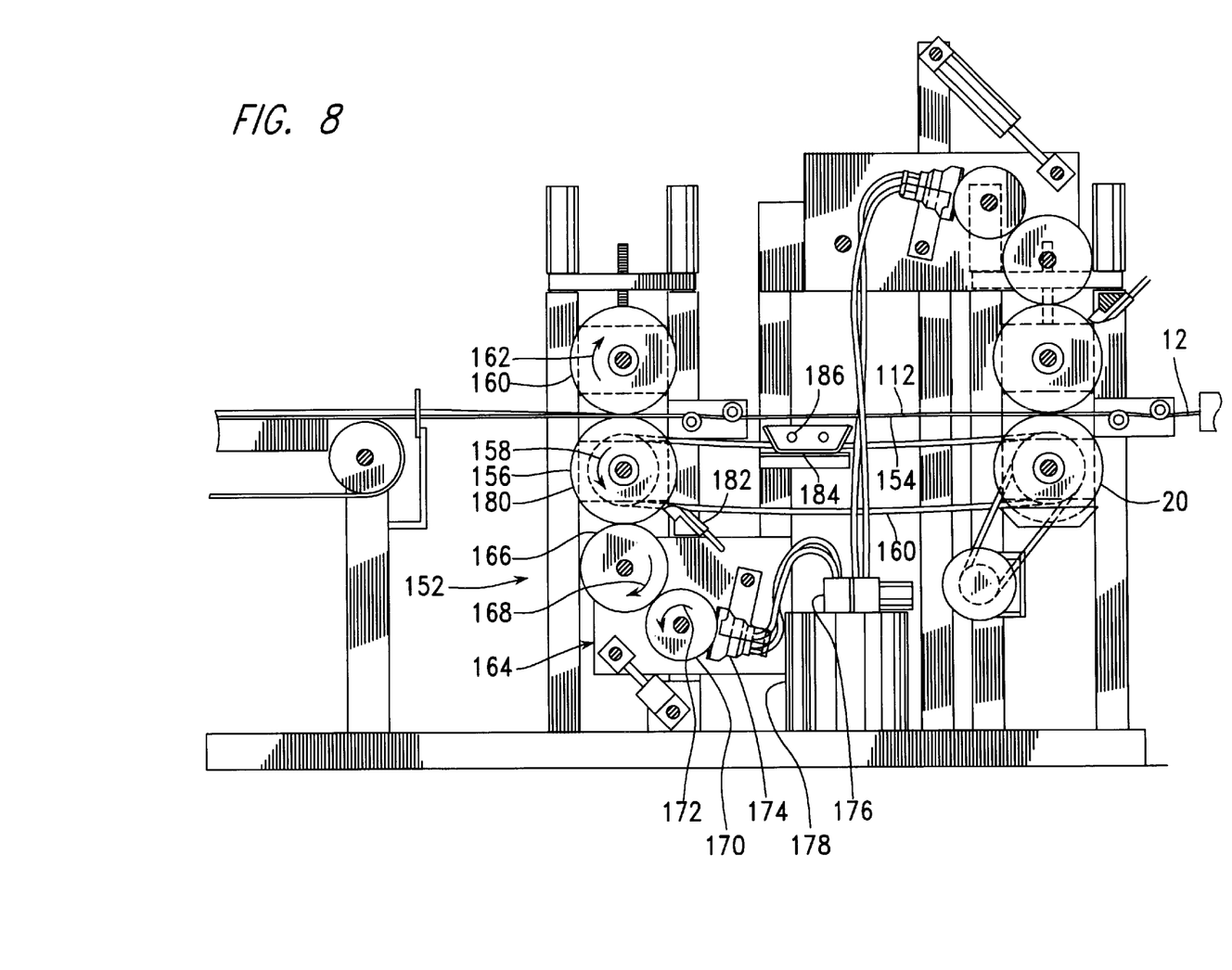
FIG. 8 is a cross-sectional front elevation of apparatus built in accordance with the present invention for embossing and printing both sides of extruded slat material.

FIG. 8 is a cross-sectional elevation of apparatus, generally indicated as 150, for embossing and painting both sides of the extruded slat material 12. FIG. 8 is taken generally as indicated by section lines II—II in FIG. 1. This apparatus 150 includes the first surface finishing station 10, which has been described above in reference to FIGS. 1 and 2, together with a second surface finishing station, generally indicated as 152, for printing and embossing the lower side 154 of the extruded slat material 112, following printing on the upper side 112 of the slat material 12 within the first surface finishing station 10.

The additional second surface finishing station 152 includes an embossing roller 156, turning in the direction of arrow 158, being driven by a belt or chain drive 160 from the back-up roller 20 of the first surface finishing station 10. The second surface finishing station 152 also includes a back-up roller 160, turning in the direction of arrow 162 through contact with the extruded slat material 12, which is clamped tightly between the back-up roller 20 and the driven embossing roller 156. The second surface finishing station 152 also includes a printing station 164 for applying a pattern of ink to the embossing roller 156. The printing station 164 includes a transfer roller 166, turning in the direction of arrow 168, and an anilox roller 170, turning in the direction of arrow 172. An ink cavity 174 applies ink to the anilox roller 170. A pump 176 maintains a circulation of ink within the ink cavity 174, from a second supply tank 178.

The second surface finishing station 152 operates as the first surface finishing station 10, in the manner described above in reference to FIGS. 1–6. The transfer roller 166 transfers ink to the embossing roller 156, with less ink being deposited in recessed areas of an embossed relief pattern on the peripheral surface 180 of the embossing roller 156. An air knife 182 then provides air currents cleaning ink droplets from relatively smooth surfaces within the inverse relief pattern on the peripheral surface 180.

A reheating station 184, including radiant elements 186 directed at the lower surface 154 of the extruded slat material 12, is optionally included between the surface finishing stations 10, 152, so that the temperature of the material 12 is returned to a temperature facilitating the embossing process. Alternately, the surface finishing stations 10, 152 may be placed close together to minimize cooling, with the paint supply tanks being moved away from a position between these stations 10,152.

Figure 9:
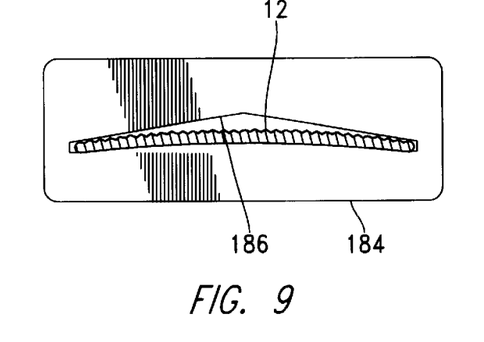
FIG. 9 is a plate for forming extruded slat material into a convex shape within the apparatus of FIG. 8.

FIG. 9 is an end view of a forming plate 184, through which the slat material 12, following embossing and printing, is pulled to form a convex shape. The forming plate 184, includes an aperture 186, through which forces the slat material into the curved shape. The single forming plate 184 may be replaced by several forming plates having increasing levels of curvature.

Referring again to FIG. 8, the slat material 12 is pulled through the forming plate 184 onto a conveyer belt 188, which carries the slat material 12 in the direction of arrow 16 away from the apparatus 150. While the forming plate 184 and conveyer belt 188 are shown as being placed adjacent the apparatus 150 to handle slat material which has been embossed and printed on both sides, it is understood that the forming plate 184 and conveyer belt 188 may alternately be placed adjacent the first surface finishing station 10, as described in reference to FIGS. 1 and 2, to handle slat material which has been embossed and printed on only one side.

Figure 10:
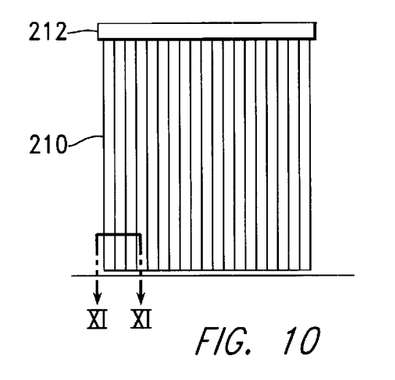
FIG. 10 is a front elevation of a vertical blind assembly including a number of slats processed within the apparatus of FIG. 1 or FIG. 8.

FIG. 10 is a front elevation of a vertical blind assembly having a number of the slats 210 hanging from a track system 212, which is of a conventional type well know to those skilled in the art of window and door coverings. Each slat 210 is of a type processed as described above, either in reference to FIGS. 1 and 2, being textured on a single side, or as described in reference to FIG. 8, being textured on both sides. Each slat 210 includes an aperture by which it is held on a slat holder (not shown) within the track system 212.

Figure 11:
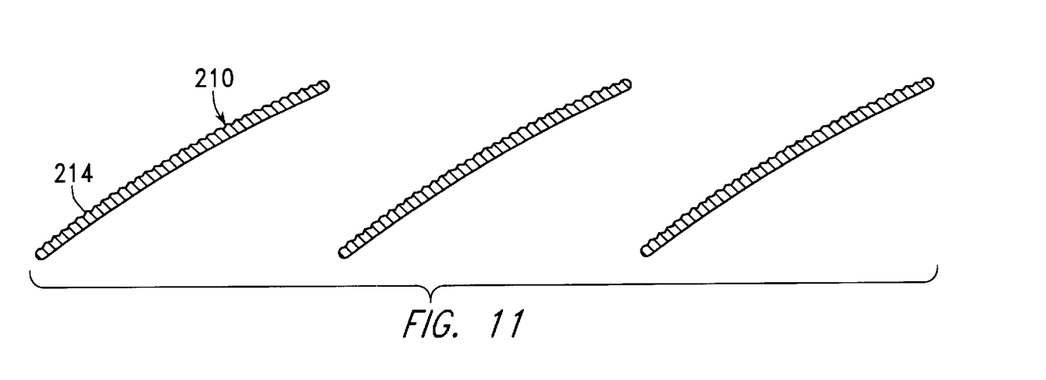
FIG. 11 is a fragmentary cross-sectional plan view of the vertical blind assembly of FIG. 10, taken as indicated by section lines XI—XI therein.

FIG. 11 is a fragmentary cross-sectional plan view of the vertical blind assembly of FIG. 10, taken as indicated by section lines XI—XI in FIG. 10 to show three slats 210. Each slat 210 has an inside surface 214, which has, for example, a textured surface formed as described above in reference to FIGS. 1 and 2. While FIG. 11 shows each slat having a textured surface on only one side, it is understood that the slats may also be of the type described above in reference to FIG. 8, having textured surfaces on both sides.

Referring to FIGS. 10 and 11, the track system 212 causes the slats 210 to rotate in unison about vertical axes between an open position in which the slats 210 are essentially parallel and a closed position, in which the slats 210 cooperate to cover the window or door (not shown) behind them. In this closed position, the slats 210 are preferably oriented so that their inside surfaces 214 face into the room in which the blind assembly is mounted. The track system 212 also causes the slats 210 to move toward one another and away from one another.

Figure 12:
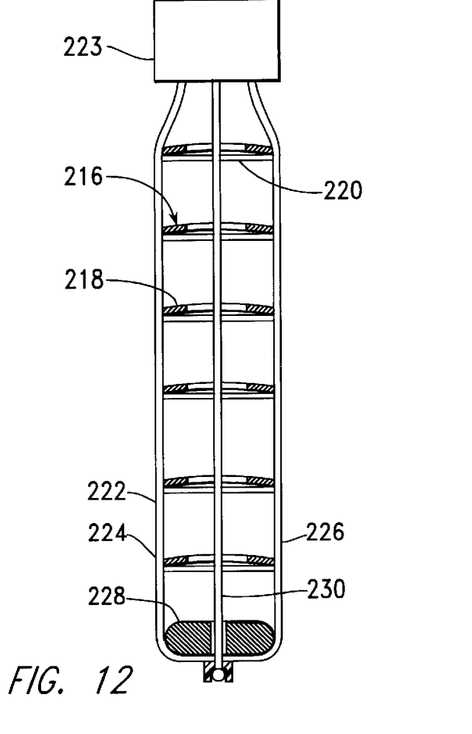
FIG. 12 is a cross-sectional end elevation of a horizontal blind assembly including a number of slats processed within the apparatus of FIG. 1 or FIG. 8.

FIG. 12 is a cross-sectional end elevation of a horizontal blind assembly including a number of slats 216 processed as described above in reference to FIGS. 1 and 2 or as described above in reference to FIG. 8. In the rotated-open position shown, each slat 216 rests, with its inside surface 218 facing upward, on a pair of transverse support cords 220 extending within a tilt cord loop 222. The slats 216 are rotated in unison and lifted to form a stack from the bottom by means of a blind mechanism 223, which is of a type well known to those skilled in the art of window coverings. The slats 216 are preferably rotated from the open position shown by moving an inside side 224 of the cord loop 222 downward while an outside side 226 of the cord loop is moved upward, so that the inside surfaces 218 of the slats 216 are exposed within the room in which the blind assembly is mounted. A lifting bar 228 is raised by means of two or more lifting cords 230 to raise the slats 216 in a stack formed from the bottom.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. A method for applying a decorative relief pattern to a surface of thermoplastic slat material, wherein said method comprises steps of:

(a) applying ink to a peripheral surface of an embossing roller, wherein said peripheral surface of said embossing roller includes an inverse relief pattern, which is an inverse of said decorative relief pattern, wherein said inverse relief pattern includes areas at various levels of depression from an outer surface level of said inverse relief pattern, wherein said ink layer is applied to said peripheral surface of said embossing roller from a uniform transfer surface having an ink coating with a predetermined uniform thickness, wherein said ink forms an ink layer extending along a portion of said peripheral surface of said embossing roller and varying in thickness in accordance to features of said inverse relief pattern, and wherein said ink layer applied to said peripheral surface of said embossing roller decreases in thickness with increases in levels of depression from said outer surface level;

(b) bringing said peripheral surface of said embossing roller into rolling contact with said surface of said thermoplastic slat material, wherein said inverse relief pattern forms said decorative relief pattern on said surface of said thermoplastic slat material, and wherein a portion of said ink layer is transferred from said peripheral surface of said embossing roller to said surface of said thermoplastic slat material.

2. The method of claim 1, wherein said transfer surface comprises a rubber coated peripheral surface of a transfer roller.

3. The method of claim 2, wherein step (a) is preceded by:

applying ink from an ink cavity to an anilox roller rotating in contact with ink within said ink cavity; and transferring ink from said anilox roller to said transfer surface moving in contact with ink applied to said anilox roller.

4. The method of claim 1, wherein said inverse relief pattern includes areas having various textures, including smooth and rough areas.

5. The method of claim 4, wherein said method additionally comprises, between steps (a) and (b), a step of exposing said peripheral surface of said embossing roller to a stream of air directed at said peripheral surface of said embossing roller, and said stream of air removes ink from said smooth areas while ink is retained in said rough areas.

6. The method of claim 1, wherein said method additionally comprises, between steps (a) and (b), a step of exposing said peripheral surface of said embossing roller to a stream of air directed at said peripheral surface of said embossing roller.

7. The method of claim 1, wherein said thermoplastic slat material is extruded before said decorative relief pattern is applied, and said decorative relief pattern is applied while said thermoplastic slat material is at a temperature sufficient to facilitate formation of said decorative relief pattern.

8. Apparatus for applying a decorative relief pattern to thermoplastic slat material, wherein said apparatus comprises:

a first embossing roller in rolling contact with a first surface of said thermoplastic slat material, wherein a peripheral surface of said first embossing roller includes a first inverse relief pattern forming a first portion of said decorative relief pattern on said first surface of said thermoplastic slat material;

a first transfer roller having a uniform surface and a uniform coating of ink in rolling contact with said first embossing roller, wherein said ink forms an ink layer extending along a portion of said peripheral surface of said first embossing roller and varying in thickness in accordance to features of said first inverse relief pattern; and a first air knife directing a stream of air at said ink layer extending along said portion of said peripheral surface of said first embossing roller before said ink layer contacts said thermoplastic slat material.

9. The apparatus of claim 8, wherein said first inverse relief pattern includes areas having various textures, including smooth and rough areas, and said stream of air from said first air knife removes ink from said smooth areas while ink is retained in said rough areas.

10. Apparatus for applying a decorative relief pattern to thermoplastic slat material, wherein said apparatus comprises:

a first embossing roller in rolling contact with a first surface of said thermoplastic slat material, wherein a peripheral surface of said first embossing roller includes a first inverse relief pattern forming a first portion of said decorative relief pattern on said first surface of said thermoplastic slat material;

a first transfer roller having a uniform surface and a uniform coating of ink in rolling contact with said first embossing roller, wherein said ink forms an ink layer extending along a portion of said peripheral surface of said first embossing roller and varying in thickness in accordance to features of said first inverse relief pattern;

a second embossing roller in rolling contact with a second surface of said thermoplastic slat material. opposite said first surface of said thermoplastic slat material, wherein a peripheral surface of said second embossing roller includes a second inverse relief pattern forming a second portion of said decorative relief pattern on said second surface of said thermoplastic slat material; and a second transfer roller having a uniform surface and a uniform coating of ink in rolling contact with said second embossing roller, wherein said ink forms an ink layer extending along a portion of said peripheral surface of said second embossing roller and varying in thickness in accordance to features of said second inverse relief pattern; and a second air knife directing a stream of air at said ink layer extending along said portion of said peripheral surface of said second embossing roller before said ink layer contacts said thermoplastic slat material.

11. The apparatus of claim 10, wherein said second inverse relief pattern includes areas having various textures, including smooth and rough areas, and said stream of air from said second air knife removes ink from said smooth areas while ink is retained in said rough areas.

* * * * *